US009653994B2

(12) United States Patent
Taguchi et al.

(10) Patent No.: US 9,653,994 B2
(45) Date of Patent: May 16, 2017

(54) POWER SUPPLY CIRCUIT AND APPARATUS INCLUDING THE CIRCUIT

(75) Inventors: Katsumi Taguchi, Yokohama (JP); Takashi Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 333 days.

(21) Appl. No.: 13/215,035

(22) Filed: Aug. 22, 2011

(65) Prior Publication Data

US 2012/0050354 A1    Mar. 1, 2012

(30) Foreign Application Priority Data

Aug. 25, 2010    (JP) .................................. 2010-188486

(51) Int. Cl.
*G01R 31/00* (2006.01)
*H02M 3/158* (2006.01)
*H02M 1/36* (2007.01)

(52) U.S. Cl.
CPC ............. *H02M 3/158* (2013.01); *H02M 1/36* (2013.01)

(58) Field of Classification Search
CPC ................................ H02M 3/158; H02M 1/36
USPC .............................................. 347/1; 327/108
See application file for complete search history.

(56) References Cited

U.S. PATENT DOCUMENTS

| 5,754,558 A * | 5/1998 | Hayakawa et al. ........... 714/721 |
| 7,255,410 B2 * | 8/2007 | Masuda .............................. 347/5 |
| 7,898,231 B2 * | 3/2011 | Shoji ............................. 323/282 |
| 2003/0213972 A1 * | 11/2003 | Ichiguchi et al. ............ 257/159 |
| 2005/0275437 A1 * | 12/2005 | Suzuki et al. ................. 327/143 |
| 2007/0070110 A1 * | 3/2007 | Kim ................................. 347/19 |
| 2010/0060078 A1 * | 3/2010 | Shaw ............................... 307/31 |
| 2010/0271074 A1 * | 10/2010 | Murashima ..................... 327/60 |

FOREIGN PATENT DOCUMENTS

| CN | 1935518 A | 3/2007 |
| JP | H06-015848 A | 1/1994 |
| JP | 2007-062264 A | 3/2007 |
| JP | 2009-303281 A | 12/2009 |

\* cited by examiner

*Primary Examiner* — Melissa Koval
*Assistant Examiner* — Courtney McDonnough
(74) *Attorney, Agent, or Firm* — Canon U.S.A. Inc., IP Division (57) ABSTRACT

A power supply device supplying power to a device via a power line is provided, where the power supply device includes a first voltage generation unit configured to generate and supply a first direct voltage to the power line, a second voltage generation unit configured to generate and supply a second direct voltage lower than the first direct voltage to the power line, a measurement unit configured to measure a voltage of the power line, a control unit configured to control supply of the first direct voltage with the first voltage generation unit after starting supply of the second direct voltage with the second voltage generation unit, and a determination unit configured to determine a state of the power supply device based on the measured voltage and a first threshold value after starting the supply of the second direct voltage.

21 Claims, 6 Drawing Sheets

POWER SUPPLY CIRCUIT AND APPARATUS INCLUDING THE CIRCUIT

BACKGROUND OF THE INVENTION

Field of the Invention

The present invention relates to a power supply circuit and an apparatus including the circuit, and particularly relates to an apparatus detecting a failure.

Description of the Related Art

The technologies to detect the electrical state of a device driven by an apparatus and the state of the apparatus have been available. According to Japanese Patent Laid-Open No. 2007-62264 disclosing a recording apparatus including a recording head corresponding to the device, it is determined whether or not a failure occurs in the recording head. When the failure occurrence is determined, the operation of the recording apparatus is stopped and information about the failure occurrence is displayed.

According to Japanese Patent Laid-Open No. 2007-62264, a power supply circuit or a power source (e.g., a DC/DC converter) supplying the voltage of the recording head is started, a voltage is supplied to the recording head, and a check of the presence or absence of a failure is made. According to the above-described method, however, the failure detection is performed for the recording head at the same voltage level as that of the operation state so that the recording head, the power supply circuit, etc. may malfunction. Particularly, a sequence including the steps of starting the DC/DC converter at least once and supplying a predetermined voltage based on the premise that the recording head is in usual conditions is performed. Accordingly, when a problem occurs in the circuit or a power line, all kinds of elements that are provided in the circuit are subjected to a thermal stress and an electrical stress.

SUMMARY OF THE INVENTION

Accordingly, the present invention provides a power supply device and a recording apparatus.

The present invention provides a power supply device supplying power to a device via a power line, where the power supply device includes a first voltage generation unit configured to generate and supply a first direct voltage to the power line, a second voltage generation unit configured to generate and supply a second direct voltage lower than the first direct voltage to the power line, a measurement unit configured to measure a voltage of the power line, a control unit configured to control supply of the first direct voltage with the first voltage generation unit after starting supply of the second direct voltage with the second voltage generation unit, and a determination unit configured to determine a state of the power supply device based on the measured voltage and a first threshold value after starting the supply of the second direct voltage.

Further features of the present invention will become apparent from the following description of exemplary embodiments with reference to the attached drawings.

DESCRIPTION OF THE EMBODIMENTS (Description of Power Supply Device)

Figure 1:
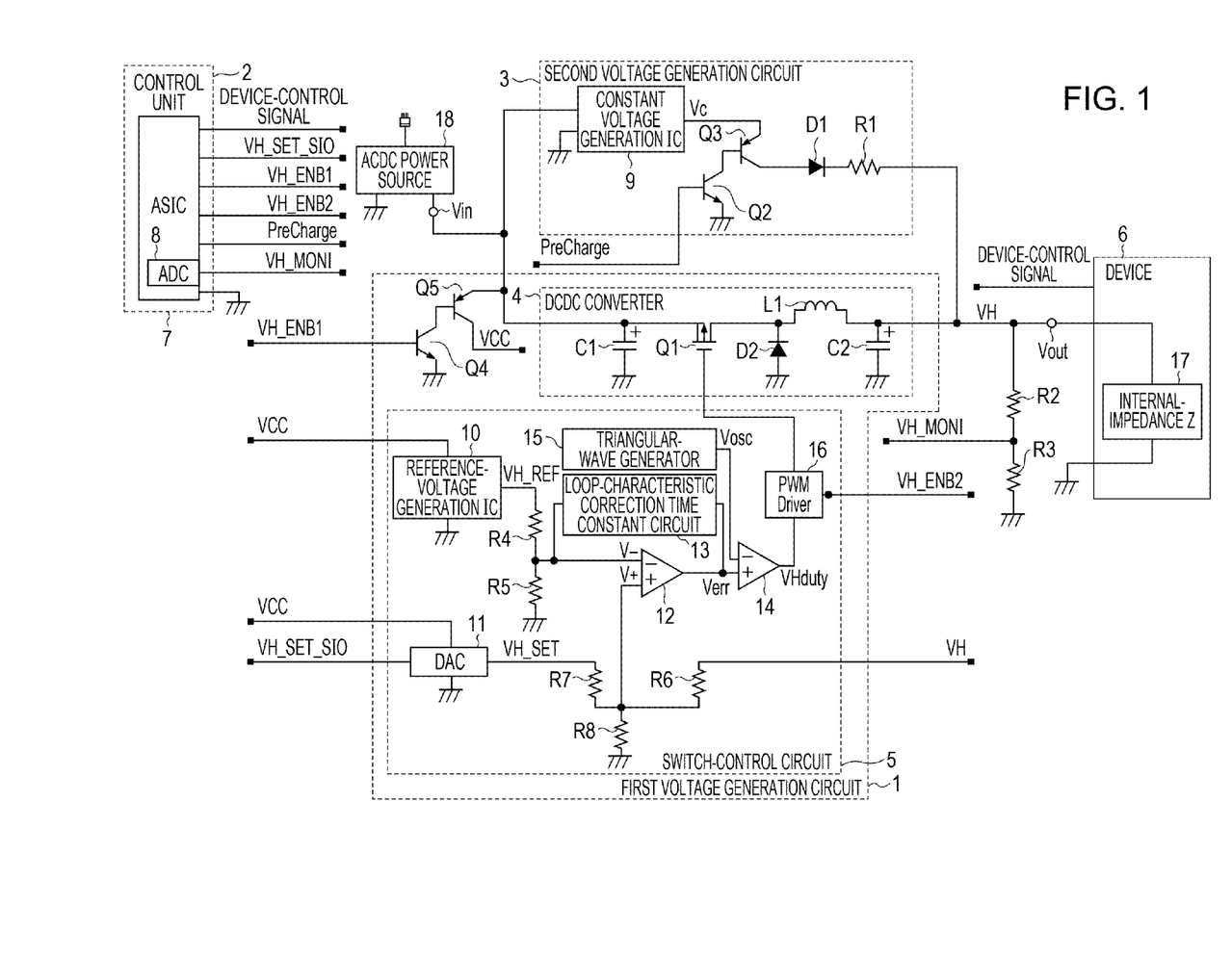
FIG. 1 illustrates an exemplary configuration of a power supply device according to an embodiment of the present invention.

FIG. 1 illustrates a power supply device (power supply circuit) according to an embodiment of the present invention. The power supply circuit includes a first voltage generation circuit 1 and a second voltage generation circuit 3 that will be described later. The power supply circuit inputs a direct voltage of 32 volts from an ACDC power source (a circuit converting an alternating voltage into a direct voltage) 18 via an input terminal Vin, and outputs a direct voltage to a device 6 via an output terminal Vout. The power supply device supplies power to the device 6 via a power supply line VH.

In the present embodiment, a recording apparatus is provided as an example of the apparatus, and a recording head is provided as an example of the device 6. The recording head is driven by a reference voltage of 21 volts. Here, the recording head is driven by a voltage of 20 to 24 volts in accordance with the temperature of the recording head and characteristics specific to the recording head. A control unit 2 is provided outside the power supply device (power supply circuit), and controls the apparatus and the power supply device (power supply circuit).

The first voltage generation circuit 1 includes a DCDC converter (direct-voltage conversion circuit) 4 and a switch-control circuit 5, and generates a direct voltage supplied to the recording head. The second voltage generation circuit 3 generates a direct voltage of 12 volts. Under the control of the control unit 2, the first voltage generation circuit 1 can generate a voltage of 17 to 25 volts.

The power supply device (power supply circuit) is provided with circuit elements including resistances R2 and R3, switching elements Q4 and Q5, and so forth in addition to the above-described circuits.

A voltage VH of the power supply line VH is divided with resistances R2 and R3 so that a voltage VH_MONI is generated. The voltage VH_MONI is input to an ASIC 7 and an AD converter 8 of the control unit 2, and is subjected to analog-to-digital (A/D) conversion. The control unit 2 detects (measures) a digital voltage value obtained through the A/D conversion. The recording head 6 includes an internal impedance Z 17.

The output voltage of the ACDC power source 18 is connected to a VCC which is the power source of the switch-control circuit 5 via the switching elements Q4 and Q5, and the connection and the interruption between the input terminal Vin and the power source VCC is controlled based on a control signal VH_ENB1 of the control unit 2.

(Description of First Voltage Generation Circuit)

The DCDC converter (direct-voltage conversion circuit) 4 is a step-down type voltage conversion circuit generated according to a PWM-control method. The DCDC converter 4 generates a direct voltage (21 volts) based on a direct voltage (32 volts) output from an ACDC power source 18, where the direct voltage (21 volts) is used to drive the recording head 6 provided as the device. The output unit of the power supply device (power supply circuit) is connected to the recording head 6 via the power supply line VH illustrated in FIG. 1. The output of the first voltage generation circuit 1 is also connected to the power supply line VH.

The switch-control circuit 5 outputs a signal used to perform the on/off control of a switching element Q1 included in the DCDC converter 4. The switch-control circuit 5 controls the switching element Q1. The switch-control circuit 5 controls a voltage output from the DCDC converter 4 by comparing the voltage VH with a setting voltage VH_SET generated based on a setting signal VH_SET_SIO transmitted from the control unit 2.

Switching elements Q4 and Q5 generate a logic voltage VCC (3.3 volts) based on a direct voltage of 32 volts, which is output from the ACDC power source 18. The logic voltage VCC is supplied to the switch-control circuit 5. The switching elements Q4 and Q5 are controlled based on the control signal VH_ENB1 output from the control unit 2.

(Description of Second Voltage Generation Circuit)

The second voltage generation circuit 3 includes a constant-voltage generation IC 9 (constant-voltage circuit), switching elements Q2 and Q3, a diode D1 provided as a rectifier element, and a current-limiting resistance R1. The second voltage generation circuit 3 and the DCDC converter 4 are connected in parallel with each other. The constant-voltage generation IC 9 generates a direct voltage Vc (12 volts) based on a direct voltage supplied from the ACDC power source 18. The voltage Vc is lower than the voltage VH generated with the DCDC converter 4. The voltage Vc is connected to the power supply line VH via the switching elements Q2 and Q3. The switching elements Q2 and Q3 perform the supply and interruption of a voltage based on a control signal PreCharge output from the control unit 2.

When the minimum voltage output from the first voltage generation circuit 1 is determined to be a voltage VH(min), the value of the voltage Vc output from the constant-voltage generation IC 9 provided in the second voltage generation circuit 3 is lower than that of the voltage VH(min).

When the forward voltage of the diode D1, a time constant obtained with a capacitor C2, and so forth are ignored, a voltage supplied from the second voltage generation circuit 3 is determined based on the voltage Vc output from the constant-voltage generation IC 9, a resistance R1, a driving circuit and the internal impedance Z 17 of the recording head 6 as indicated by Equation (2) that follows:

$$VH=Vc*Z/(R1+Z) \quad \text{Equation (2)}.$$

(Description of DCDC Converter)

The DCDC converter 4 includes the switching element Q1, a capacitor C1, the capacitor C2, a diode D2, and a choke coil L1. An input voltage Vin of the DCDC converter 4 is connected to the diode D2 via the capacitor C1 provided to stabilize a supplied voltage and the switching element Q1. When the switching element Q1 is turned on and off repeatedly, the input voltage Vin is converted into a pulse voltage (rectangular wave). The pulse voltage is converted into a direct voltage VH with a smoothing circuit including the choke coil L1 and the capacitor C2, and supplied to the recording head 6, which is a load, as an output of the DCDC converter 4. Since the DCDC converter 4 operates under an ordinary step-down type switching regulator system, the details of power-conversion operations of the DCDC converter 4 will be omitted in the present embodiment.

(Description of Switch Control Circuit)

The switch-control circuit 5 includes a reference-voltage generation IC 10, a DA converter 11, an error amplifier 12, a loop-characteristic correction time constant circuit 13, a pulse-width modulation comparator 14, a triangular-wave generator 15, a driver (PWM_Driver) 16, and resistances R4, R5, R6, R7, and R8. The reference-voltage generation IC 10 generates a reference voltage VH_REF based on a voltage VCC supplied as the power source. A voltage V− obtained by dividing the reference voltage VH_REF with the resistances R4 and R5 is determined to be a reference voltage used to perform the constant-voltage feedback control, and input to the inversion terminal of the error amplifier 12.

The control unit 2 outputs the setting signal VH_SET_SIO based on the target voltage value of the voltage VH, performs D/A conversion for the setting signal VH_SET_SIO with the DA converter 11 so that the setting voltage VH_SET is generated. The setting voltage VH_SET is divided with the resistances R6, R7, and R8, and connected to the non-inversion terminal of the error amplifier 12 so that an output voltage is controlled. The error amplifier 12 compares the input voltage V− of the inversion terminal with an input voltage V+ of the non-inversion terminal so that the value of an output voltage Verr is determined. The loop-characteristic correction time constant circuit 13 stabilizes an output voltage and performs the constant-voltage feedback control for the voltage VH.

The voltage V+ of the non-inversion terminal of the error amplifier 12 has a value indicated by Equation (3) that follows, and the voltage V− of the inversion terminal of the error amplifier 12 has a value indicated by Equation (4) that follows.

$$V+=(VH*R8/R6+VH\_SET*R8/R7)/(1+R8/R6+R8/R7) \quad \text{Equation (3)}$$

$$V-=R5/(R4+R5)*VH\_REF \quad \text{Equation (4)}$$

When the voltage VH_REF output from the reference-voltage generation IC 10 has a value of 3.3 volts, the voltage-dividing resistances R4 and R5 provided for the reference voltage VH_REF have values of 5.6 kΩ and 3.3 kΩ, and the voltage-dividing resistances R6, R7, and R8 that are provided for the voltages VH and VH_SET have values of 24 kΩ, 8.2 kΩ, and 1.32 kΩ, the voltages V+ and V− have the following values.

$$V+=(0.055*VH+0.161*VH\_SET)/1.216$$

$$V-=1.223V$$

Here, when the set voltage value of the setting voltage VH_SET is determined to be 2.0 volts and the voltage Vc output from the constant voltage generation IC 9 is determined to be 12.2 volts, and the charging characteristic is saturated and the forward voltage of the diode D1 is ignored for convenience' sake, the voltage VH has a value of 12.0 volts and the voltage V+ has a value of 0.808 volts. Accordingly, since the value of the voltage V− is larger than that of the voltage V+, the voltage Verr output from the error amplifier 12 becomes a "low-level (Lo)" output, and a signal VHduty output from the pulse-width modulation comparator 14 is on-output to the driver 16 as long as a voltage output from the triangular-wave generator 15 is higher than the voltage Verr.

The driver 16 outputs a signal VH_PWM so that the switching element Q1 executes conduction (on)/interruption (off) based on the level of the signal VHduty input thereto. When the signal VH_PWM is in a "high level (Hi)", the switching element Q1 is in the off state. When the signal VH_PWM is in the "low level (Lo)", the switching element Q1 is in the on state.

The driver 16 performs control to interrupt the switching element Q1 based on a control signal VH_ENB2 transmitted from the control unit 2. The driver 16 outputs the "low level (Lo)" signal for the on-output signal VHduty so that the switching element Q1 enters the conductive state. Therefore, power of 36 volts is supplied, electric charges are accumulated in the capacitor C2, and the voltage is increased.

When the voltage VH attains 21.18 volts, the equation V+=V−=1.223 volts holds based on Equations (3) and (4) that are stated above. Further, the voltage Verr output from the error amplifier 12 becomes a "high level (Hi)" output. Since the voltage Verr output from the error amplifier 12 is always higher than the voltage output from the triangular-wave generator 15, the pulse-width modulation comparator 14 presents an off-output to the driver 16. Accordingly, the driver 16 makes the switching element Q1 enter the interruption state and the voltage VH is stabilized. That is, the value of the output voltage VH corresponding to the setting voltage VH_SET having a value of 2.0V is 21.18V, and when the voltage VH is decreased due to the device 6 being driven, the output of the error amplifier 12 attains the "low level (Lo)" again so that the voltage VH is increased. Here, when the maximum value of the voltage VH_SET is determined to be 3.3V, the value of the corresponding voltage VH becomes 17.38V which is the minimum output voltage VH (min) achieved as the voltage VH corresponding to the resistance constant.

A voltage Vosc output from the triangular-wave generator 15 is connected to the inversion terminal of the pulse-width modulation comparator 14 and the voltage Verr output from the error amplifier 12 is connected to the non-inversion terminal of the pulse-width modulation comparator 14. The signal VHduty is output based on the value of a comparison of an error output Verr and a triangular wave Vosc. The signal VHduty output from the pulse-width modulation comparator 14 becomes a pulse waveform having the period of the triangular wave Vosc, the pulse waveform being responsive to a duty ratio obtained through the constant-voltage feedback control of the voltage VH. The pulse waveform is connected to the driver (PWM_Driver) 16.

(Description of Control Unit)

The control unit 2 includes memories (a ROM and a RAM) that are not shown in addition to integrated circuits including the ASIC 7 or the like. The control unit 2 further includes an output port provided to output a control signal and an input port provided to input a signal. Data of a threshold value used to determine the value of the voltage VH_MONI is stored in the memory (ROM).

The control unit 2 makes a determination based on the voltage VH_MONI and the threshold value. When the determination result is unusual (error), the control unit 2 stops driving the recording head 6 and performs error processing so that a serviceman or a user is informed of the error, for example. The control unit 2 stops the operation of the power supply circuit by controlling signals including the control signal PreCharge, the control signals VH_ENB1 and VH_ENB2, and so forth.

(Description of Control Flow of Power Supply Circuit)

Next, the control of the above-described power supply circuit will be described. A recording apparatus configured to record image data by making a recording head perform scanning is provided as an exemplary apparatus including the power supply circuit. The device 6 is the recording head.

Figure 2:
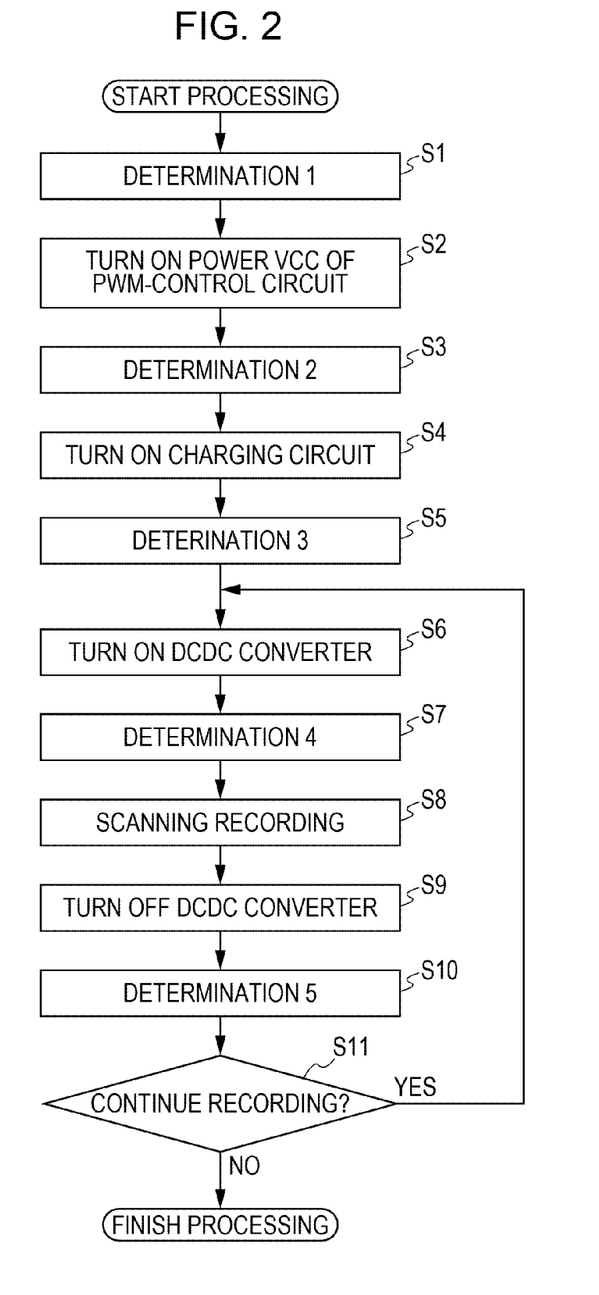
FIG. 2 illustrates the control flow of a power supply device according to an embodiment of the present invention.
Figure 3:
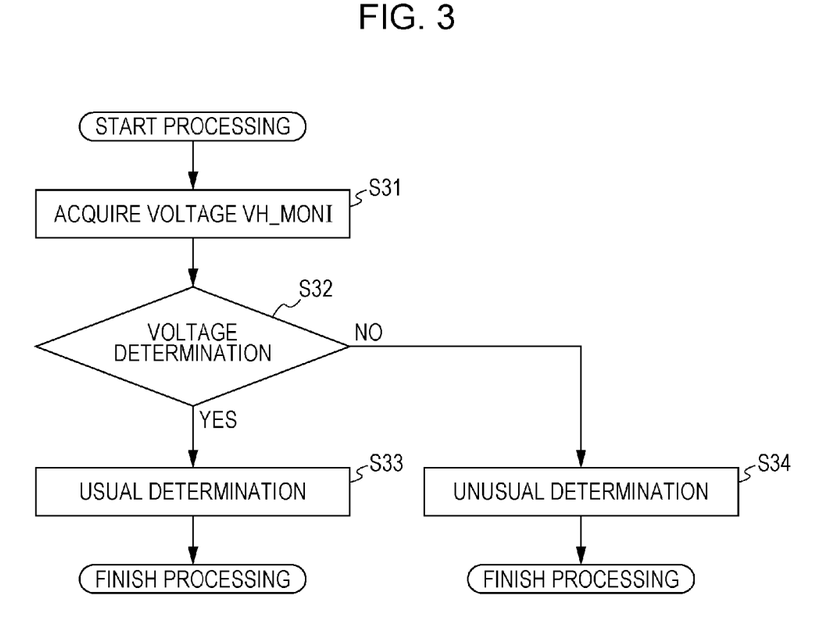
FIG. 3 illustrates the control flow of a power supply device according to an embodiment of the present invention.
Figure 4:
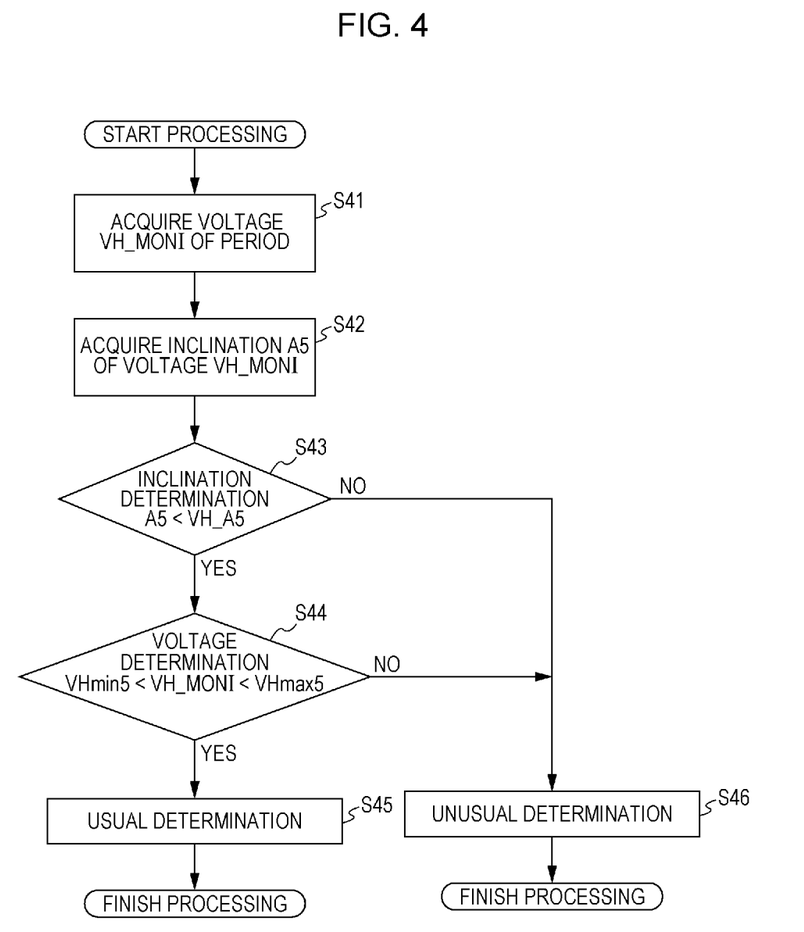
FIG. 4 illustrates the control flow of a power supply device according to an embodiment of the present invention.

The control flow illustrated in FIG. 2 is executed by the control unit 2. The control includes the voltage generation performed with the power supply circuit, the measurement of the generated voltage, and the determination of a state relating to the power supply, which is made based on the voltage-measurement result. Each of FIGS. 3 and 4 illustrates the control flow describing the determination steps that are shown in FIG. 2. When the determination result is unusual, the control unit 2 performs the above-described error processing.

When starting the processing procedures that are shown in FIG. 2, the initial state is expressed as PreCharge, the signal VH_ENB1 is in the "low level (Lo)", and the signal VH_ENB2 is in the "high level (Hi)". Further, each of the switching elements Q3 and Q5, and the driver 16 is interrupted.

A determination 1 is made at step S1 to determine that the voltage VH is at a potential of 0V based on the voltage VH_MONI. When the result of the determination 1 is usual, the processing advances to step S2. Otherwise, the processing advances to the above-described error processing. In that case, the control illustrated in FIG. 2 is stopped in progress.

At step S1, the control signal PreCharge of the second voltage generation circuit 3 is in the "low level (Lo)". Therefore, both the switching element Q2 and Q3 are interrupted (the switching elements Q2 and Q3 are in off state), and a voltage PreVH output from the second voltage generation circuit 3 is maintained at a potential of 0V. Further, since the control signal VH_ENB1 is in the "low level (Lo)" so that the switching elements Q4 and Q5 are interrupted (the switching elements Q4 and Q5 are in off state), the voltage VCC, which is the logic power source of the switch-control circuit 5, is not supplied and none of the circuits that are included in the switch-control circuit 5 operate. Still further, the switching element Q1 of the DCDC converter 4 is also interrupted and the voltage VH is maintained at a potential of 0V. The determination 1 is made before timing T1 illustrated in FIG. 5.

At step S2, the on-control of the voltage VCC, which is the logic power source of the switch control circuit (PWM-control circuit) 5, is performed. Upon receiving an instruction transmitted from the ASIC 7 illustrated in FIG. 1, the control signal VH_ENB1 transmitted from the control unit 2 is changed from the "low level (Lo)" to the "high level (Hi)" so that the switching elements Q4 and Q5 are brought into conduction (the switching elements Q4 and Q5 are in on state). Consequently, the voltage Vin output from the ACDC power source 18 is supplied to the logic power source VCC. The logic power source VCC supplies power to a circuit block of the switch-control circuit 5 so that each circuit becomes operable. The states of the voltage values of the control signals and the voltage VH, which are attained at that time, are illustrated in the period of from timing T1 to timing T2 of FIG. 5.

The voltage VH output from the power supply circuit is maintained at a potential of 0V. Therefore, the voltage V+ of the non-inversion terminal of the error amplifier 12 becomes 0V irrespective of the value of the setting voltage VH_SET. Since the value of the voltage V− is larger than that of the voltage V+, the value of the voltage Verr output from the error amplifier 12 becomes negative, that is, 0V.

When the value of the voltage Verr input to the non-inversion terminal of the pulse-width modulation comparator 14 is sufficiently low, the output signal VHduty of the pulse-width modulation capacitor 14 becomes a pulse waveform having a duty ratio of about 100% so that the output of the DCDC converter 4 is increased. At step S2, however, the control signal VH_ENB2 transmitted from the control unit 2 is in the "high level (Hi)". Therefore, the driver 16 outputs the signal VH_PWM which is in the "high level (Hi)" so that the switching element Q1 is interrupted.

Next, a determination 2 is made at step S3. The control unit 2 uses the same threshold value as that of the determination 1, because the switching element Q1 of the DCDC converter 4 shall be interrupted and maintained at a potential 0V in usual conditions. When the result of the determination 2 is usual, the processing advances to step S4. Otherwise, the processing advances to the above-described error processing so that the control illustrated in FIG. 2 is stopped in progress. When the determination result is unusual, it is assumed that the signal VH_PWM output from the driver 16 is in a conductive state, for example.

At step S4, the second voltage generation circuit (charging circuit) 3 is turned on. Upon receiving an instruction transmitted from the ASIC 7, the control signal PreCharge transmitted from the control unit 2 is changed from the "low level (Lo)" to the "high level (Hi)" so that the switching elements Q2 and Q3 are brought into conduction. As a result, the voltage Vc (12 volts) output from the constant-voltage generation IC 9 of the second voltage generation circuit 3 is output to the power supply line VH. The states of the voltage values of the control signals and the voltage VH, which are attained at that time, are illustrated in the period of from timing T2 to timing T3 of FIG. 5. During the period of from timing T2 and timing T3, the capacitor C2 is charged and the voltage of the power supply line VH is increased. At timing T3, the voltage of the power supply line VH attains 12 volts.

Next, a determination 3 is made at step S5 to confirm that the value of the voltage VH falls within a desired voltage range. When the result of the determination 3 is usual, the processing advances to step S6. Otherwise, the processing advances to the above-described error processing so that the control of FIG. 2 is stopped in progress.

Next, the DCDC converter 4 is turned on at step S6. That is, the on/off control of the switching element Q1 is started. When the control signal VH_ENB2 transmitted from the control unit 2 is changed from the "high level (Hi)" to the "low level (Lo)" based on an instruction transmitted from the ASIC 7, the driver 16 starts performing the on/off control of the switching element Q1 based on the input signal VHduty. Consequently, the value of the voltage of the power supply line VH is increased from 12 volts.

Figure 5:
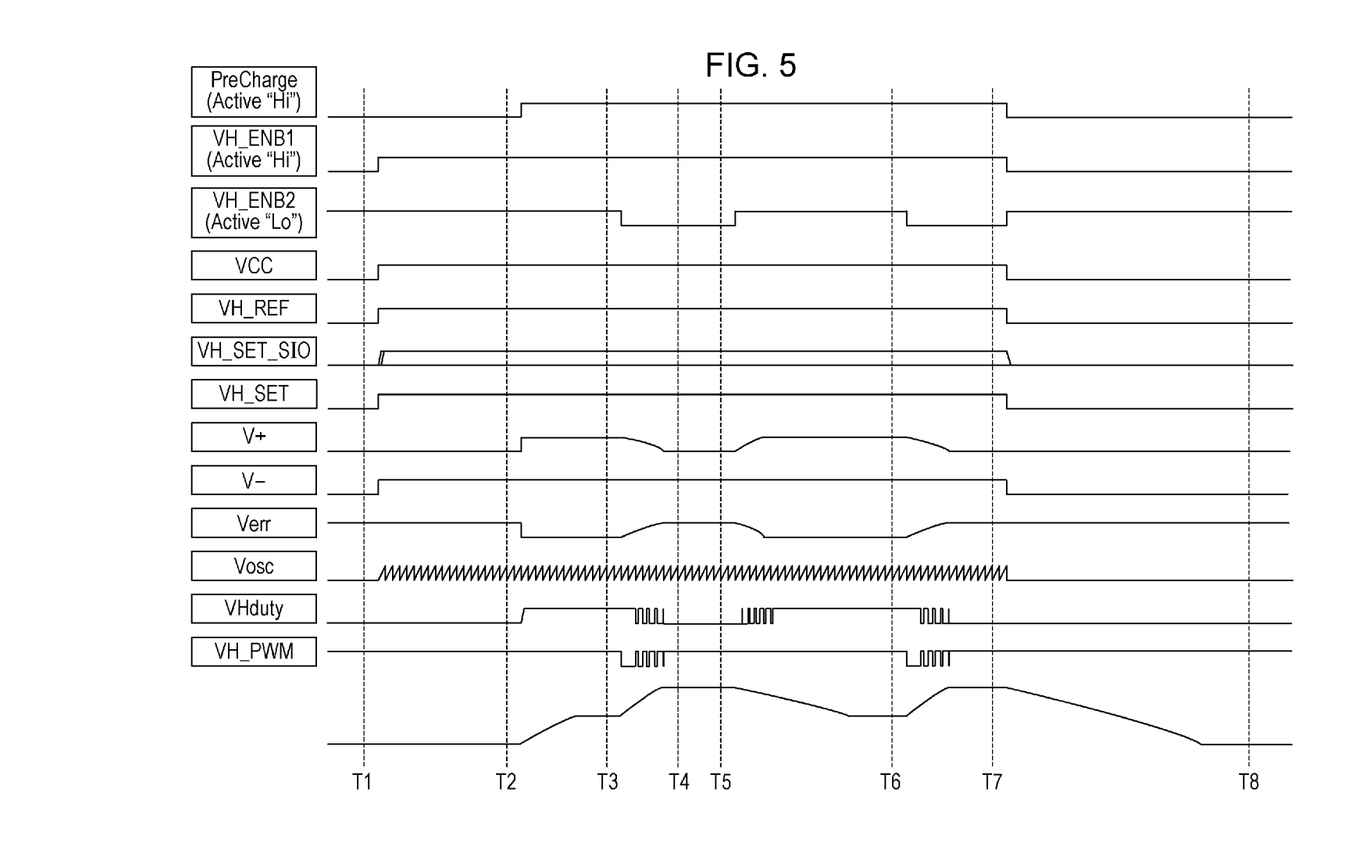
FIG. 5 is a timing chart of the voltages and the control signals of a power supply device according to an embodiment of the present invention.

The states of the voltage values of the control signals and the voltage VH, which are attained at step S6, are illustrated in the period of from timing T3 to T4 of FIG. 5. The capacitor C2 is charged and the value of the voltage of the power supply line VH is increased from 12 volts to 21 volts. At timing T3, the value of the voltage VH is 12 volts. Therefore, an inrush current flowing into the switching element Q1 during the period of from timing T3 to timing T4 becomes smaller than that attained in the case where the value of the voltage VH is 0 volt. Further, the time consumed to attain a target voltage value can also be reduced.

At step S7, the control unit 2 makes a determination 4 after waiting for a predetermined time. When the result of the determination 4 is usual, the processing advances to step S8. Otherwise, the processing advances to the above-described error processing so that the control of FIG. 2 is stopped in progress.

Next, at step S8, data is recorded onto the recording medium by making the recording head 6 perform scanning. The states of the control signals and the voltage VH, which are indicated in the scanning record, are illustrated in the period of from timing T4 to timing T5 of FIG. 5.

When the scanning performed with the recording head 6 is finished, the recording operations of the recording apparatus are temporarily stopped to change the scanning direction. At that time, the state of the power supply system is confirmed. The confirmation is performed at steps S9 and S10.

First, at step S9, the control signal VH_ENB2 transmitted from the control unit 2 is changed from the "low level (Lo)" to the "high level (Hi)" based on an instruction transmitted from the ASIC 7 so that the driver 16 stops outputting signals and the switching element Q1 is interrupted. Here, the voltage value of the voltage VH, which is set based on the setting voltage VH_SET, is accumulated in the capacitor C2 as an electric charge, and because the internal impedance Z 17 of the recording head 6 discharges the capacitor C2, the voltage value is gradually decreased. On the other hand, the voltage supply is continued with the second voltage generation circuit 3. Therefore, the value of the voltage VH is decreased and maintained at 12 volts.

After step S9, a determination 5 is made at step S10. A determination of whether or not a change in the value of the voltage VH is decreased at a desired rate and a determination of the voltage value are made. The voltage values of the control signals and the voltage VH, which are attained at steps S9 and S10, are illustrated in the period of from timing T5 to T6 of FIG. 5.

For example, when the electric charge accumulated in the capacitor C2 at timing T5 is determined to be q2(0), an electric charge q2(t) obtained after a time t elapses is expressed by the following equation.

$$Q2(t)=q2(0)\exp(-t/C2*Z) \qquad \text{Equation (5)}$$

When the voltage VH attained at timing T5 is determined to be 21 volts and the capacitance of the capacitor C2 is determined to be 10 microfarads (µF), the electric charge q2(0) becomes 0.21 C. The discharging characteristic of the electric charge q2(t) depends on the internal impedance Z 17 of the recording head 6. Therefore, when the control unit 2 sets a threshold value VH_A5 to an appropriate value, it becomes possible to determine whether or not the state of the recording head 6 is changed during the scanning recording.

When the value of the internal impedance Z 17 is significantly decreased, the time-discharging amount of the electric charge q2(t) is increased and an inclination A5 of the voltage VH_MONI indicates a large value. In that case, it is determined that an electrical shorting state occurs in the power supply circuit or the recording head 6 for some reasons.

In relation to the determination 4, the operation of the DCDC converter 4, which is performed during the determination 5, is the off control. Therefore, even though the determination 4 indicates that the electrical shorting state is insignificant and can be complemented with the constant-voltage feedback control, it can be determined that something unusual occurs through the determination 5.

Next, at step S11, it is determined whether or not the scanning recording is finished in response to a print instruction. When it is determined that the recording operation shall be continued, the processing returns to step S6 so that the on control of the DCDC converter 4 is performed again.

The states of the control signals and the voltage VH, which are attained at steps S11 to S6, are illustrated in the period of from timing T6 to timing T7 of FIG. 5. When the recording operation is finished (No: step S11), the processing procedures of FIG. 2 are finished, as illustrated in the period of from timing T7 to timing T8 of FIG. 5.

Thus, when starting the power supply for the recording head 6, the determination of the supply-voltage level is divided into steps, and the voltage-level determination is made at each step. Consequently, the circuit state can be determined with safety without subjecting the device or the elements of the circuit to a thermal stress or an electrical stress. Next, the above-described determination processing will be described.

(Description of Determination 1)

The determination 1 is described with reference to FIG. 3. At step S31, the ASIC 7 acquires the voltage VH_MONI, and the voltage determination is made at step S32. The control unit 2 determines a voltage VHmax1 as a threshold value in advance. When the value of the voltage VH_MONI is lower than the threshold value (YES), it is determined that the result is usual (usual determination) at step S33. On the other hand, when the value of the voltage VH_MONI is higher than the threshold value (NO), it is determined that the result is unusual (unusual determination) at step S33, and the error processing is performed.

The value of the voltage VH_MONI is expressed by Equation (1) that follows based on the voltage VH and the voltage-dividing resistances R2 and R3.

$$VH\_MONI=VH*R3/(R2+R3) \quad \text{Equation (1)}$$

When the voltage-diving resistances R2 and R3 of the voltage VH_MONI are exemplarily determined to be 96 kΩ and 10 kΩ, the value of the voltage VH_MONI becomes 0V when that of the voltage VH is 0V, and the state of the power supply circuit is determined to be appropriate. When a voltage of 5.3V or more is applied to the voltage VH in the case where the threshold value VHmax1 is 0.5V, it is determined that the power supply circuit is in a conductive state for some reasons, and the processing is shifted to the error processing.

(Description of Determination 2)

Since the determination 2 is equivalent to the determination 1, the description thereof is omitted.

(Description of Determination 3)

The determination 3 will also be described with reference to FIG. 3. Voltages VHmin3 and VHmax3, which are provided as two threshold values, are determined in advance based on the value of the voltage Vc of the second voltage generation circuit 3. The control unit 2 makes a determination at step S32 as is the case with the determination 1. When a usual determination is made at S33, the processing is finished. However, when the result of step S32 indicates VHmin3<VH_MONI<VHmax3 (outside the threshold-value range), it is determined that the value of the internal impedance Z 17 of the device 6 is significantly decreased or a failure occurs in the constant-voltage generation IC 9, and the error processing is performed at step S34.

When the value of the voltage Vc is 12.0 volts, the internal impedance Z 17 is 750 kΩ, and the resistance R1 is 2.4 kΩ, the values of the voltages VH and VH_MONI are 11.81 volts and 1.11 volts.

Here, the threshold values VHmin3 and VHmax3 are determined to be 0.59 volts and 1.3 volts. When the value of the voltage VH_MONI is 0.57 volts at that time, the value of the voltage VH is 6.0 volts and that of the internal impedance Z 17 is 12 kΩ. Therefore, it can be determined that an electrical shorting state occurs in either the device 6 or the second voltage generation circuit 3. Further, when the value of the voltage VH_MONI is 1.4 volts, the values of the voltage VH and the voltage Vc are 14.8 volts and 15.0 volts. Therefore, it can be determined that the output-voltage value of the constant-voltage generation IC 9 is inappropriate.

(Description of Determination 4)

The determination 4 will also be described with reference to FIG. 3. Voltages VHmin4 and VHmax4 that are determined in advance based on a voltage value determined based on the control signal VH_SET_SIO transmitted from the control unit 2 are used as threshold values. The control unit 2 determines a voltage at step S32 as is the case with the determination 1. When the determination result is YES, the control unit 2 performs the usual-determination processing. After that, the processing is finished and the processing advances to step S8 illustrated in FIG. 2.

On the other hand, when the value of the voltage VH_MONI does not fall within the threshold-value range at step S32, it is determined that a failure occurs in the switch-control circuit 5, the unusual-determination processing (error processing) is performed at step S34, and the processing is finished.

(Description of Determination 5)

The determination 5 will be described with reference to FIG. 4. Immediately after the control signal VH_ENB2 is changed to the "Hi" level at step S9, the processing procedures of FIG. 4 are performed at regular intervals. The voltage VH_MONI is acquired at step S41, and the inclination A5 of the voltage value is acquired at step S42.

Next, at step S43, the control unit 2 determines an inclination VH_A5 to be a threshold value, the inclination VH_A5 being determined in advance based on the internal impedance Z 17, and compares the threshold value VH_A5 with the inclination A5 acquired from the voltage VH_MONI. When the acquired value is less than the threshold value VH_A5, the processing advances to step S44 to make the voltage determination. When the acquired value is larger than the threshold value VH_A5, the processing advances to S46.

At step S44, the value of the voltage VH_MONI is compared with the threshold values VHmin5 and VHmax5 that are determined in advance with the control unit 2. Consequently, the minimum level of the voltage VH is determined. When the value of the voltage VH_MONI does not fall within the threshold-value range, the processing advances to step S46 where the unusual-determination processing (error processing) is performed and the processing is finished.

The determination made at step S44 is equivalent to the determination 3. That is, when the value of the voltage VH_MONI is significantly lower than 12 volts, it can be determined that an electrical-shorting state occurs in the power supply circuit or the recording head 6. When the electrical-shorting state occurs in the recording head 6, it can be determined that the value of the internal impedance Z 17 is decreased, for example.

(Additional Information)

Additional information about the control unit 2 will be provided. The ASIC 7 controls the ink ejection by transmitting signals DATA, CLK, etc. to the recording head 6, where the signals DATA, CLK, etc. are provided to drive and control the recording head 6. Further, the control unit 2 outputs and controls the signals PreCharge, VH_SET_SIO, VH_ENB1, and VH_ENB2 that are provided to control a recording-head driving circuit, and detects the voltage VH with the AD converter 8 as the voltage VH_MONI.

Further, the control unit 2 includes a power circuit (not shown) configured to input a voltage VHIN output from the ACDC power source 18 and generate a logic voltage (3.3 volts, for example) supplied to the ASIC 7 or a signal-processing circuit. The logic voltage may be generated with the ACDC power source 18.

Further, the ACDC power source 18 may have the function of switching between the normal-operation state and the power-conservation state to control the level of the voltage VHIN. In that case, the switching to the power-conservation state is performed under the control of the control unit 2.

The power source VCC of the switch-control circuit 5 is supplied from the voltage VHIN output from the ACDC power source 18 via the switching elements Q4 and Q5. However, the power source VCC may be supplied from the above-described power circuit generating the logic voltage.

In the present embodiment, the power source VCC can be turned off based on the control signal VH_ENB1 to reduce the power consumption of the apparatus. However, the VCC supply may be continued to simplify the control.

(Description of Recording Apparatus)

Figure 6:
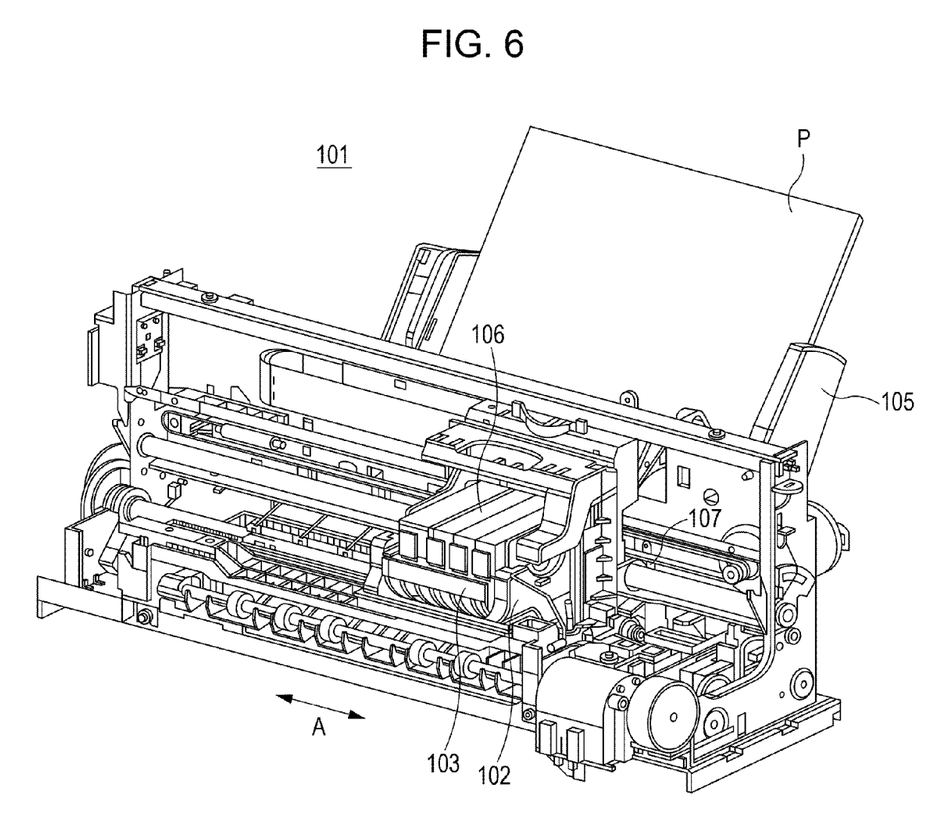
FIG. 6 illustrates a recording apparatus including a power supply device according to an embodiment of the present invention.

FIG. 6 illustrates a recording apparatus 101 provided as an example of the apparatus. In the recording apparatus 101, a recording head 103 ejecting ink according to an inkjet method (corresponding to the device 6 of FIG. 1) is mounted on a carriage 102, and the carriage 102 is reciprocated along a direction indicated by arrow A to record data. A recording medium P including a recording sheet or the like is fed into the recording apparatus 101 via a paper-feed mechanism 105, and conveyed to a recording position. Then, ink is ejected from the recording head 103 onto the recording medium P at the recording position so that data is recorded onto the recording medium P.

In addition to the recording head 103, an ink cartridge 106 is mounted on the carriage 102, for example. The ink cartridge 106 stores ink supplied to the recording head 103. The ink cartridge 106 is mounted on the carriage 102 in a removable manner.

The recording apparatus 101 illustrated in FIG. 6 can record data in color. Therefore, four ink cartridges accommodating individual magenta (M) ink, cyan (C) ink, yellow (Y) ink, and black (K) ink are mounted on the carriage 102. The four ink cartridges can be mounted or demounted independently of one another.

The recording head 103 of the present embodiment adopts an inkjet method for ejecting ink through the use of thermal energy. Therefore, the recording head 103 includes electric thermal conversion members that are provided for individual ejection orifices. A pulse voltage is applied to the corresponding electric thermal conversion member in response to a recording signal. Accordingly, ink is ejected from the corresponding ejection orifice.

Other Embodiments

In the above-described embodiment, the two types of voltage generation circuits are provided. However, three or more types of voltage generation circuits may be provided. Further, the value of an element provided in the power supply circuit, the value of a generated voltage, a threshold value, and so forth are not limited to those of the above-described embodiment.

Further, a capacitor may be connected between the terminal Vout of the power supply line VH and the device.

Still further, even though the five determination steps are provided in the above-described embodiment, part of the determination steps may be eliminated. For example, the processing of the determination 1 or the determination 2 that are illustrated in FIG. 2 may be eliminated.

Further, the processing of the determination 5, which is illustrated in FIG. 2 of the above-described embodiment, is performed each time the scanning recording is finished. Without being limited to the control configuration, the determination 5 may be made once every few scanning recordings.

In the above-described embodiment, an apparatus including the power supply circuit is a recording apparatus. However, the power supply circuit may be provided in other apparatuses. When the apparatus including the power supply circuit is an image input apparatus, the device corresponds to a read unit including an optical element or a sensor. Further, when the apparatus including the power supply circuit is a display apparatus, the device corresponds to an optical element and/or the driver unit thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188486 filed Aug. 25, 2010, which is hereby incorporated by reference herein in its entirety.

What is claimed is:

1. A device, comprising:
a first voltage generation unit configured to generate and supply a first voltage being used to driving a load to a power line supplying power to the load;
a second voltage generation unit configured to generate and supply a second voltage lower than the first voltage to the power line;
an acquiring unit configured to acquire a voltage value based on a voltage of the power line;
a determination unit configured to perform a determination to determine whether an electronic state is in an error state based on a voltage value acquired by the acquiring unit, and
a control unit configured to control the first voltage generation unit and the second voltage generation unit,
wherein the determination unit performs a first determination to determine whether the electronic state is in the error state based on an amount of change of a first acquired voltage value acquired per determined time acquired by the acquiring unit under a condition in which the control unit controls the second voltage generation unit to supply the second voltage and the first voltage generation unit to stop supplying of the first voltage after starting supply of the first voltage with the first voltage generation unit, at a timing when a driving operation of the load is stopped after driving the load, and
wherein the control unit causes the device to stop an operation in a case where the determination unit determines that the electric state is an error in the first determination.

2. The device according to claim 1, wherein the determination unit performs the first determining to determine whether a state of the load and/or a state of power supplied to the power line is in the error state based on the first acquired voltage value.

3. The device according to claim 1, wherein the first voltage generation unit includes a DC/DC converter.

4. The device according to claim 1, wherein the second voltage generation unit includes a constant voltage circuit configured to generate the second voltage, and a diode and a switch that are provided between the constant voltage circuit and the power line.

5. The device according to claim 1, wherein the determination unit further performs a second determination to determine whether the electronic state is in the error state based on whether a second acquired voltage value, acquired by the acquiring unit under a condition in which the control unit controls the first voltage generation unit to start supplying of the first voltage, is within a predetermined range.

6. The device according to claim 5, wherein the determination unit determines that the electronic state is not in the error state in the second determination in a case where the second acquired voltage value is within a predetermined range, and wherein the control unit drives the load in a case where the determination unit determines that the electronic state is not in the error state in the second determination.

7. The device according to claim 1, wherein the determination unit performs the first determination based on whether the amount of change of the first acquired voltage value per determined time is larger than a first threshold.

8. The device according to claim 1, wherein the determination unit determines whether the electronic state is in the error state in the first determination based on the amount of change of the first acquired voltage value per determined time and comparing the first acquired voltage value with a second threshold.

9. The device according to claim 1,
wherein the load is a recording head, and
wherein the determination unit performs the first determination at a timing when the recording head temporarily stops an operation while performing the operation after a scanning performed with the recording head in at least one direction is finished.

10. The device according to claim 1, wherein the control unit controls the first voltage generation unit not to supply the first power to the power line and the second voltage generation unit not to supply the second power to the power line respectively in a case where the determination unit determines that the electronic state is in the error state in the first determination.

11. The device according to claim 1, wherein the first voltage is direct voltage.

12. The device according to claim 1, wherein the determination unit performs a third determination of determining whether the electronic state is in the error state based on a third acquired voltage value, acquired by acquisition unit under a condition in which the second power is supplied by the second voltage generation unit to the power line before supplying the first power by the first voltage generation unit, a a third threshold.

13. The device according to claim 1, wherein the first voltage generation unit comprises a conversion circuit which includes a switching element and a switch-control circuit which includes a driver outputting a control signal for controlling the switching element.

14. The device according to claim 1, wherein the determination unit performs a fourth determination of determining whether the electronic state is not in the error state based on a fourth voltage value acquired by the acquiring unit under a condition in which the control unit controls the first voltage generation unit not to supply the first voltage and the second voltage generation unit not to supply the second voltage, and a fourth threshold.

15. The device according to claim 1, wherein a voltage acquired by the acquiring unit is acquired by dividing of the voltage of the power supply line with resistances.

16. The device according to claim 1, wherein the first acquired value is acquired under a condition in which the first voltage generation unit stops supplying the first voltage to the power line and the driving of the load is stopped.

17. The device according to claim 1, wherein the second voltage generation unit supplies the second power having the second voltage, via a current-limiting resistance, to the power line.

18. The device according to claim 1, further comprising a capacitor connected to the power line.

19. The device according to claim 1, further comprising the load, wherein the load is a recording head configured to eject ink.

20. A method comprising:
generating a first voltage being used to driving a load and supply a first power having the first voltage to a power line supplying power to the load by a first voltage generation unit;
acquiring a voltage value based on a voltage of the power line;
determining whether an electronic state is in an error state,
wherein, in the determining, a first determination to determine whether the electronic state is the error state based on an amount of change of a first acquired voltage value per determined time acquired under a condition in which a second voltage generation unit supplies of the second voltage, and the first voltage generation unit stops supplying of the first voltage after starting supply of the first voltage with the first voltage generation unit, at a timing when a driving operation of the load is stopped after driving the load, and
wherein the device is caused to stop an operation in a case where it is determined that the electric state is in the error state in the first determination.

21. The device according to claim 13,
wherein the first voltage generation unit comprises a switch-control circuit and a direct-voltage conversion circuit which includes a switching element, and
wherein the determination unit performs a fifth determination to determine whether the electronic state is not in the error state based on a fifth voltage value acquired by the acquiring unit under a condition in which the control unit controls of supplying voltage to the switch-control circuit and the switching element included in the direct-voltage conversion circuit is in an interrupted state, and a fifth threshold.

* * * * *